Figure 1:
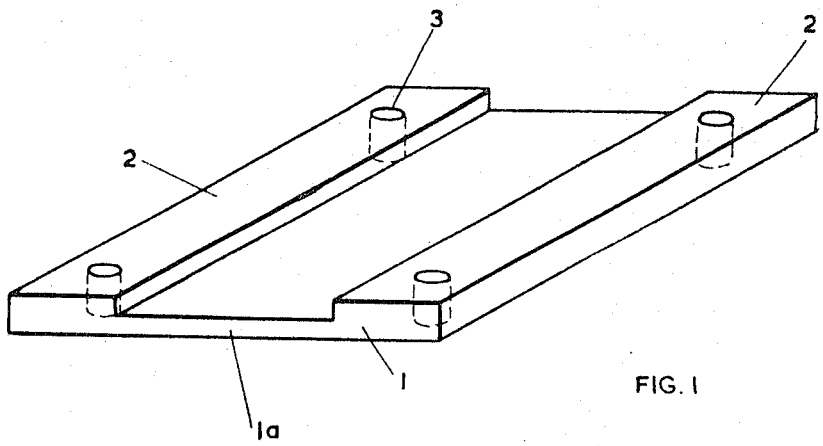
Figure 2:
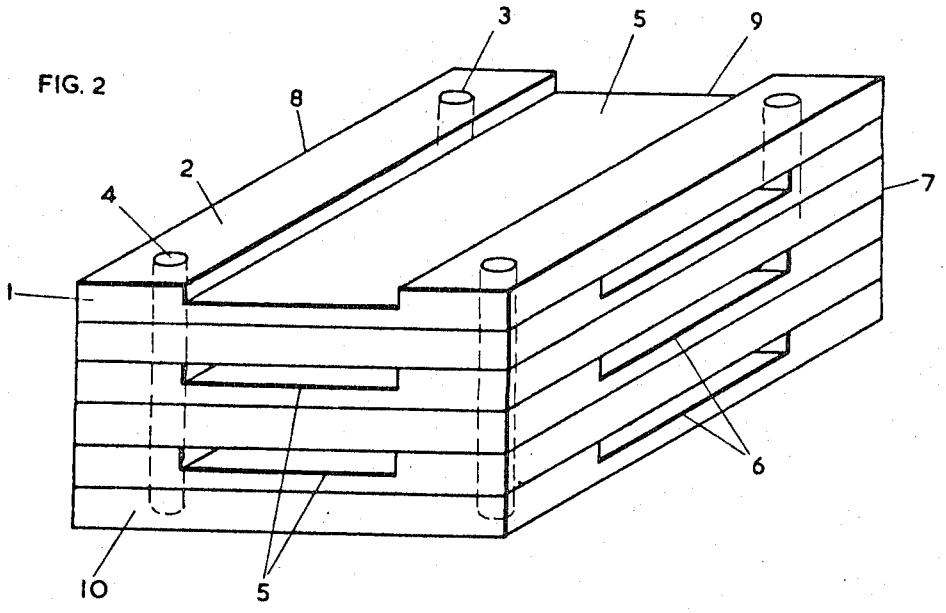
Figure 3:
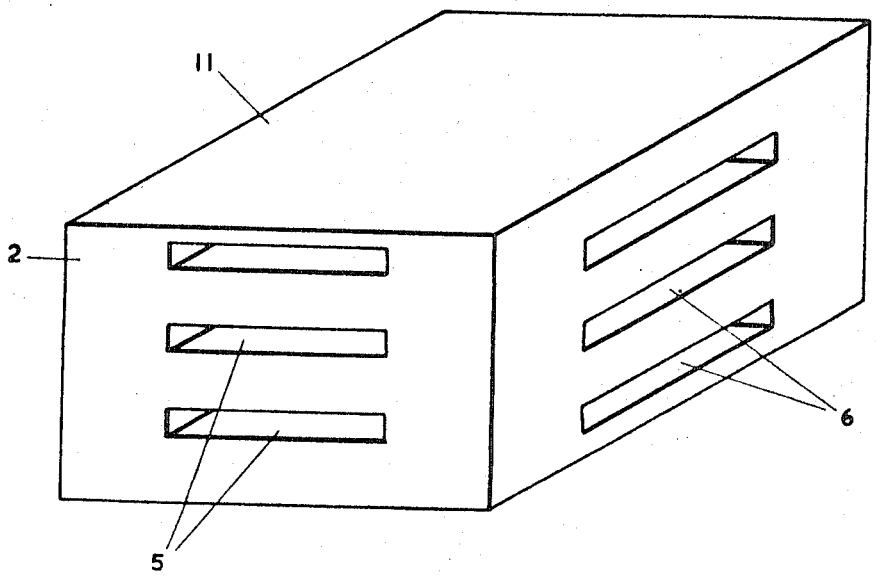
Figure 4:
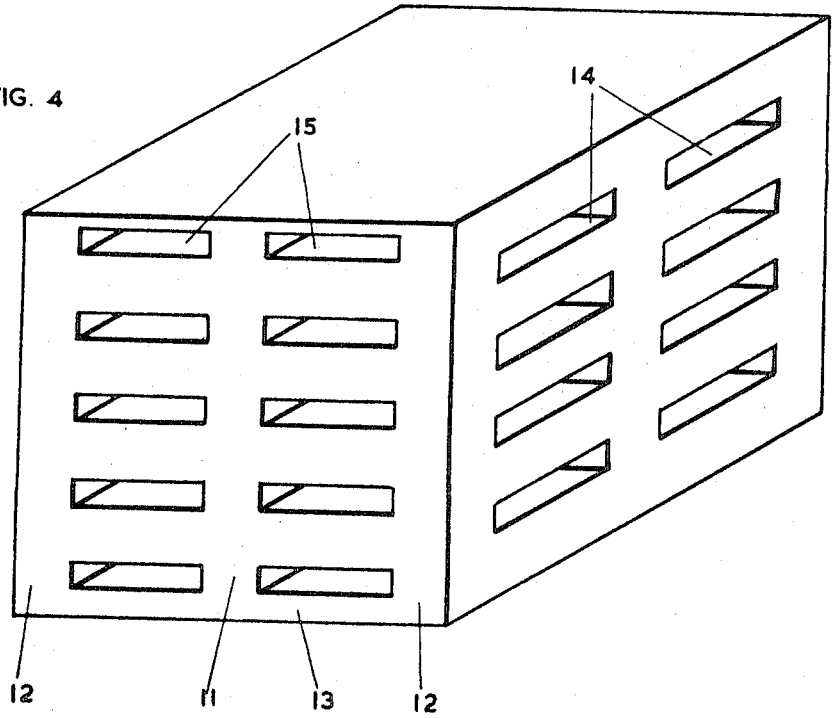
Figure 5:
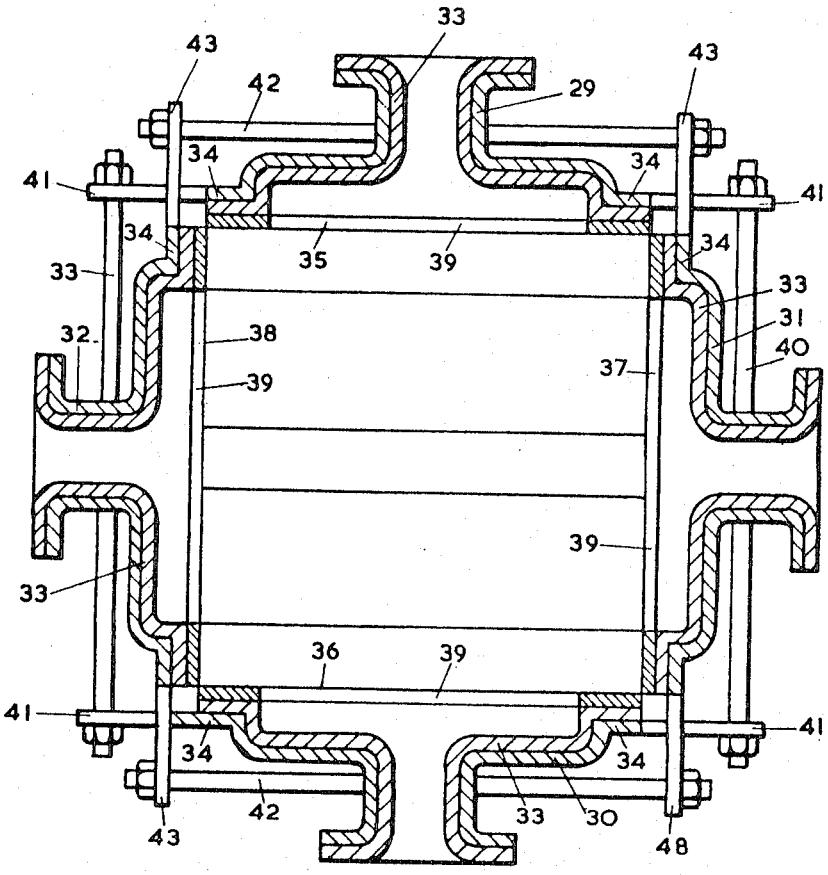
Figure 6:
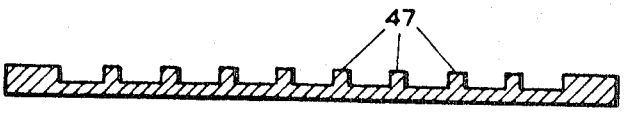
Figure 7:
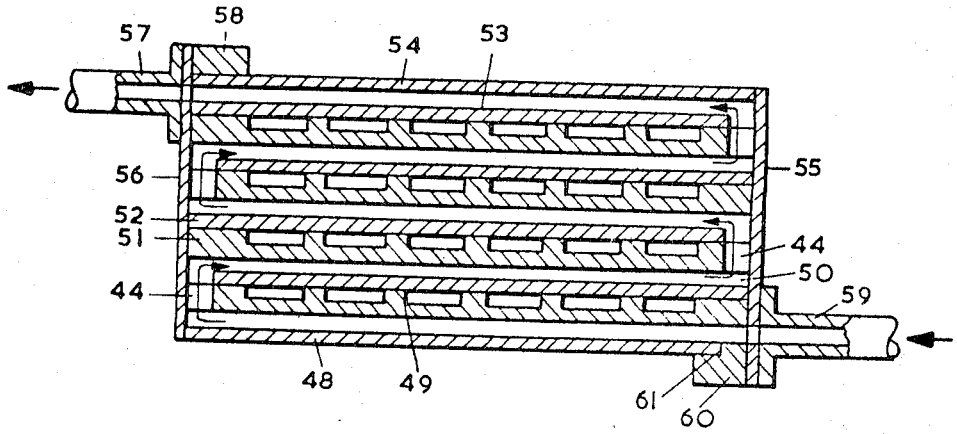
Figure 8:
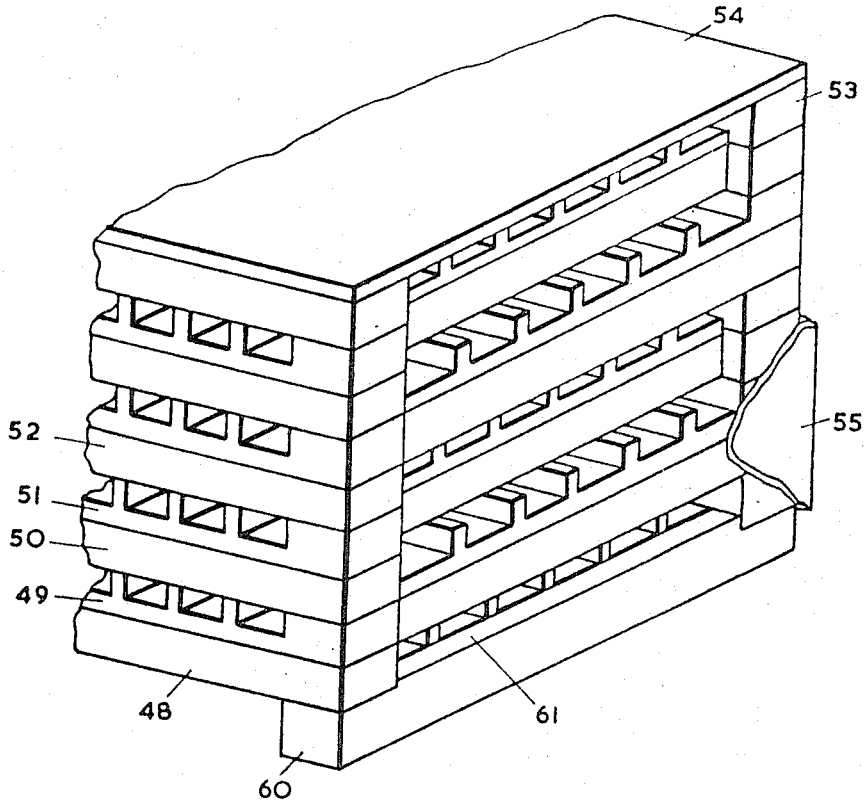
Figure 9:
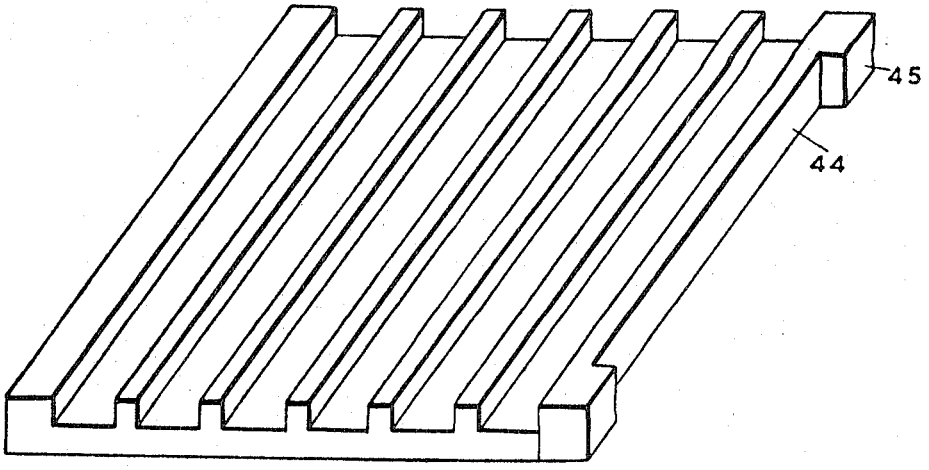
Figure 10:
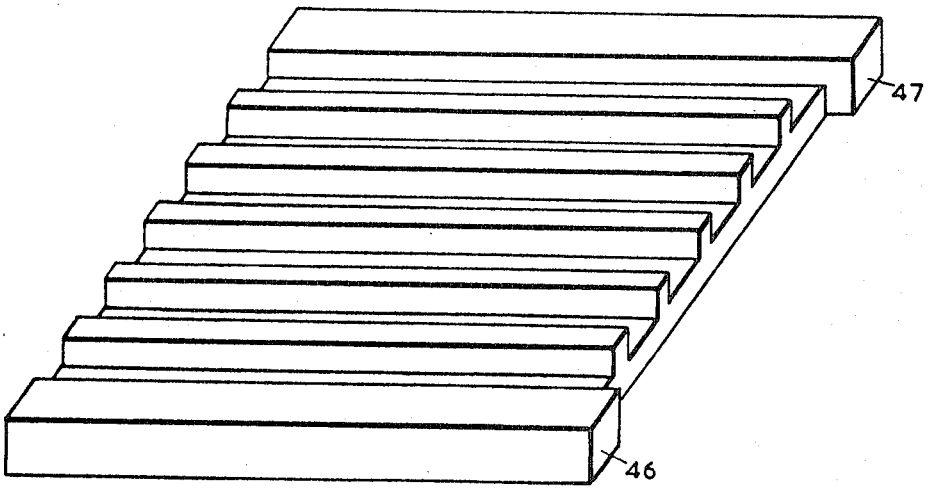

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 26, 1973

911 O.G. 1136

T911,013

HEAT EXCHANGERS

David Evan Bryan Morgans, Hatfield, and Frank Smith, Widnes, England, assignors to Imperial Chemical Industries Limited, London, England

Filed Aug. 13, 1971, Ser. No. 171,426

Claims priority, application Great Britain, Aug. 28, 1970, 41,603/70

**Int. Cl. F28f *3/00***

U.S. Cl. 165—166

5 Sheets Drawing. 10 Pages Specification

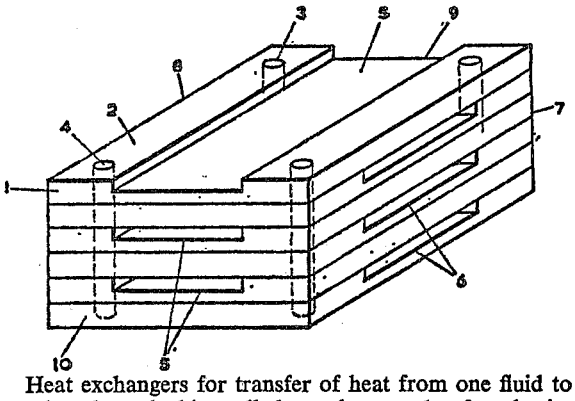

Heat exchangers for transfer of heat from one fluid to another through thin walled members made of a plastics material resistant to corrosive action of the fluids. The heat exchanger is a block formed from plates of plastics material spaced apart from each other, at least over areas intermediate their edges, for flow of fluid therebetween and spacers of plastics material at opposite edges of the plates forming seals between adjacent plates at the edges and defining passages for fluids between spaced apart areas of the plates. In one embodiment one set of passages terminates at one pair of faces of the block and another set of passages, not communicating with the first set, terminates at a different pair of faces of the block. Thus a fluid of one temperature circulates adjacent a fluid of a different temperature, the fluids being separated from each other by a thin walled member.

Suitable plastics materials include any polymeric material capable of withstanding the temperature, pressure and corrosive conditions within the heat exchanger. Illustrative materials include polytetrafluoroethylene, high density polyethylene and polypropylene.

Sheet thickness, sufficient to provide fluid separation yet thin enough to provide for sufficient heat transfer, is usually from 0.01–1.0 mm., preferably 0.25–0.5 mm. Spacer thickness is not critical but should be chosen to provide sufficient flow of fluid through the exchanger.

HEAT EXCHANGERS

Filed Aug. 13, 1971 5 Sheets-Sheet 1

HEAT EXCHANGERS

Filed Aug. 13, 1971 5 Sheets-Sheet 4